United States Patent [19]

Head

[11] Patent Number: 4,571,550
[45] Date of Patent: Feb. 18, 1986

[54] QAM DEMODULATOR CARRIER RECOVERY LOOP USING N-M LSB'S

[75] Inventor: Manley J. Head, Wylie, Tex.

[73] Assignee: Rockwell International Corporation, El Segundo, Calif.

[21] Appl. No.: 623,801

[22] Filed: Jun. 22, 1984

[51] Int. Cl.[4] .................. H03D 3/18; H03K 9/02; H04L 5/12; H04L 23/02
[52] U.S. Cl. .................. 329/50; 329/109; 329/124; 375/39; 375/120; 455/214
[58] Field of Search .............. 329/50, 109, 122, 124; 375/120, 39; 455/214

[56] References Cited

U.S. PATENT DOCUMENTS

| | | | |
|---|---|---|---|
| 3,638,125 | 1/1972 | Goell | 329/124 X |
| 3,789,316 | 1/1974 | Goetz et al. | 329/124 |
| 4,054,838 | 10/1977 | Tretter | 375/120 |
| 4,105,975 | 8/1978 | Sanders et al. | 375/120 X |
| 4,188,589 | 2/1980 | Brown et al. | 329/122 X |
| 4,458,356 | 7/1984 | Toy | 375/120 |
| 4,464,770 | 8/1984 | Maurer et al. | 375/119 |

FOREIGN PATENT DOCUMENTS 2735945 4/1978 Fed. Rep. of Germany ........ 329/50

*Primary Examiner*—Eugene R. LaRoche
*Assistant Examiner*—D. C. Mis
*Attorney, Agent, or Firm*—V. Lawrence Sewell; H. Frederick Hamann

[57] ABSTRACT

A quadrature amplitude modulation (QAM) demodulator system derives a local oscillator signal which has the frequency and phase of the suppressed carrier of the QAM signal, so as to permit proper demodulation. In-phase and quadrature channels of the demodulator system each have an analog-to-digital converter with n output bits, where n is greater than m, the number of bits required for the data output for each channel. The n-m less significant bits are used to derive a signal indicating the error in phase alignment between the local oscillator signal and the QAM signal. In a phase locked loop, this error signal drives a voltage-controlled oscillator to phase lock with the suppressed carrier of the QAM signal. To acquire frequency and phase lock, a digital-to-analog converter in the loop is clocked each time the phase alignment of the VCO signal and QAM signal is close.

15 Claims, 3 Drawing Figures

QAM DEMODULATOR CARRIER RECOVERY LOOP USING N-M LSB'S

BACKGROUND OF THE INVENTION

This invention relates to demodulation of a Quadrature Amplitude Modulation (QAM) signal. In particular, it relates to the derivation of a local oscillator output which is at the frequency of the suppressed carrier of the QAM signal and which is phase aligned with respect to the QAM signal for properly demodulating it.

In a basic digital transmission system, the baseband signal has one of two values, designated logic 0 or logic 1. In the receiver of a digital radio for such a system, the technical problems concern identifying which of these two states is being received in a given bit interval. The problems of accurately performing this identification in the presence of various forms of noise and distortion are well known.

In a QAM system, there are more states. For example, in a 16 QAM system, the problem becomes one of identifying which of sixteen states has been transmitted. These are not sixteen different signal amplitude levels, but sixteen different combinations of amplitudes and phases in a vector space representation of the signals.

The QAM signal is a suppressed carrier signal. In order to demodulate it, it is necessary to somehow derive a local oscillator voltage having the precise frequency of the suppressed carrier of the received QAM signal and having the exact phase alignment with the QAM signal as did the carrier. It should be apparent from the large number of states transmitted and the complexity of the resulting QAM signal waveform, that deriving the local oscillator signal from the QAM signal waveform represents a considerable technical challenge. Of course, the problem is compounded since the received QAM signal is distorted by the transmission process.

SUMMARY OF THE INVENTION

In accordance with the present invention there is provided a QAM demodulator having in-phase and quadrature channels, each with an m bit demodulated output, thus defining a $2^m \times 2^m$ QAM vector space. Each of the channels of the demodulator has a phase detector with one input receiving the QAM signal to be demodulated and the other input receiving a local oscillator signal at the carrier frequency. The output of each phase detector is processed by an analog-to-digital converter with an output of more than m bits, with the demodulated output being taken from the most significant m bits of the converter. The less significant bits can be used, in accordance with the invention, to derive the necessary local oscillator signal.

From the less significant bits, there is derived a signal indicating the error in phase alignment between the local oscillator signal and the vector space of the QAM signal. The error, digital-to-analog converted and filtered, is applied to the input of a voltage-controlled oscillator (VCO). The output of the oscillator is phase shifted and then supplied to the phase detectors, inphase and shifted by ninety degrees. A phase locked loop is formed which drives the VCO to generate the required local oscillator signal at the carrier frequency and necessary phase alignment.

In order to acquire frequency and phase lock in the demodulator of the invention, a particular clocking circuit is provided. The clock circuit responds to the less significant bits of the analog-to-digital converter to enable a clock for the digital-to-analog conversion each time the phase alignment of the local oscillator signal and QAM signal is close. The effect is to drive the demodulator to the frequency and phase locked condition.

The system of the present invention successfully solves the problem of carrier recovery in a QAM demodulator. It has been found suitable for 16 QAM and 64 QAM systems and is able to derive the necessary local oscillator signal under practical radio transmission operating conditions.

DESCRIPTION OF PREFERRED EMBODIMENT

The description hereinafter is generally applicable to QAM systems, including 64 QAM, but for clarity will be described in terms of 16 QAM. A preferred embodiment of the system according to the invention employed a 70 MHz suppressed carrier transmission.

THE DEMODULATOR SYSTEM

Figure 1:
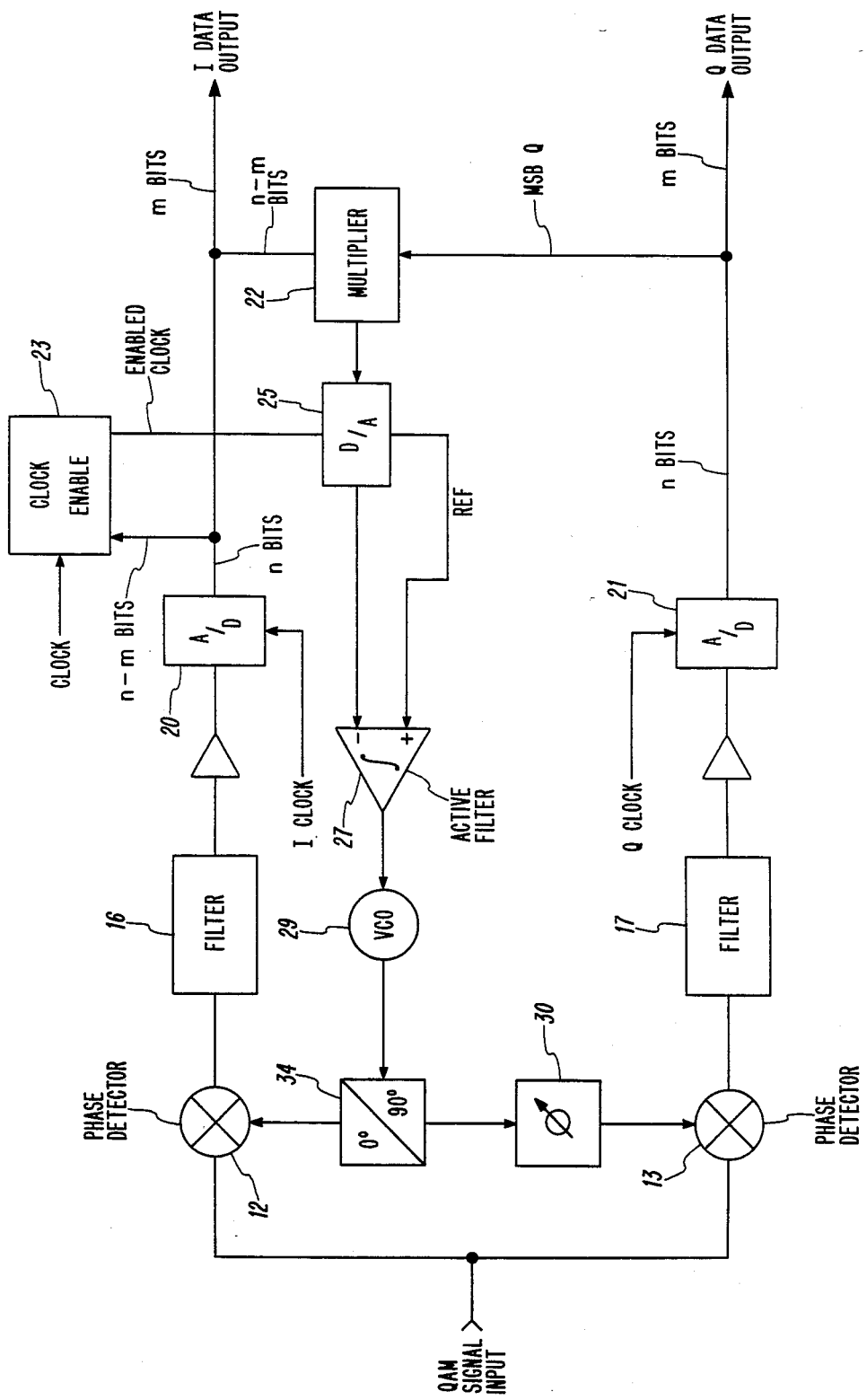
FIG. 1 is a block diagram of a QAM demodulation system in accordance with the invention.

FIG. 1 shows a block diagram of a demodulation system in accordance with the invention. A received QAM signal is applied to one input of phase detector 12 of the in-phase (I) channel and to one input of phase detector 13 of the quadrature (Q) channel. The outputs of detectors 12 and 13 are filtered by filters 16 and 17, providing spectral shaping complementary to related filtering in the transmission process. After amplification, analog-to-digital converters 20 and 21 provide an n bit digital representation of the detected and filtered waveforms in their respective channels. In a preferred embodiment, the output of the analog-to-digital converters is 5 bits. The number of bits, m, necessary to represent the demodulated output of one channel of a 16 QAM system is 2. In this preferred embodiment, the remaining three bits of the analog-to-digital output are used to derive the necessary phase aligned signal at the carrier frequency.

The n-m bits are processed, including by a digital-to-analog converter 25 and filter 27 to drive voltage-controlled oscillator 29. The output of the voltage controlled oscillator, which operates nominally at the QAM carrier frequency, is applied through the phase port of a 0°/90° hybrid 31 to local oscillator inputs of phase detectors 12 and 13. A phase adjustment circuit 30 ensures a 90° difference between the carrier frequency signal applied to detector 12 and that applied to detector 13.

In the circuit of FIG. 1, the n-m bits used for control are derived from the I channel. These control bits could also be derived from the Q channel. The loop formed by the chosen channel and including digital-to-analog converter 25 and voltage-controlled oscillator 29 form a phase locked loop which drives the output of VCO 29 into phase alignment with the demodulated QAM output and thus the received QAM signal. For an understanding of this process, consideration is given to FIG. 2.

THE QAM SIGNAL VECTOR SPACE

Figure 2:
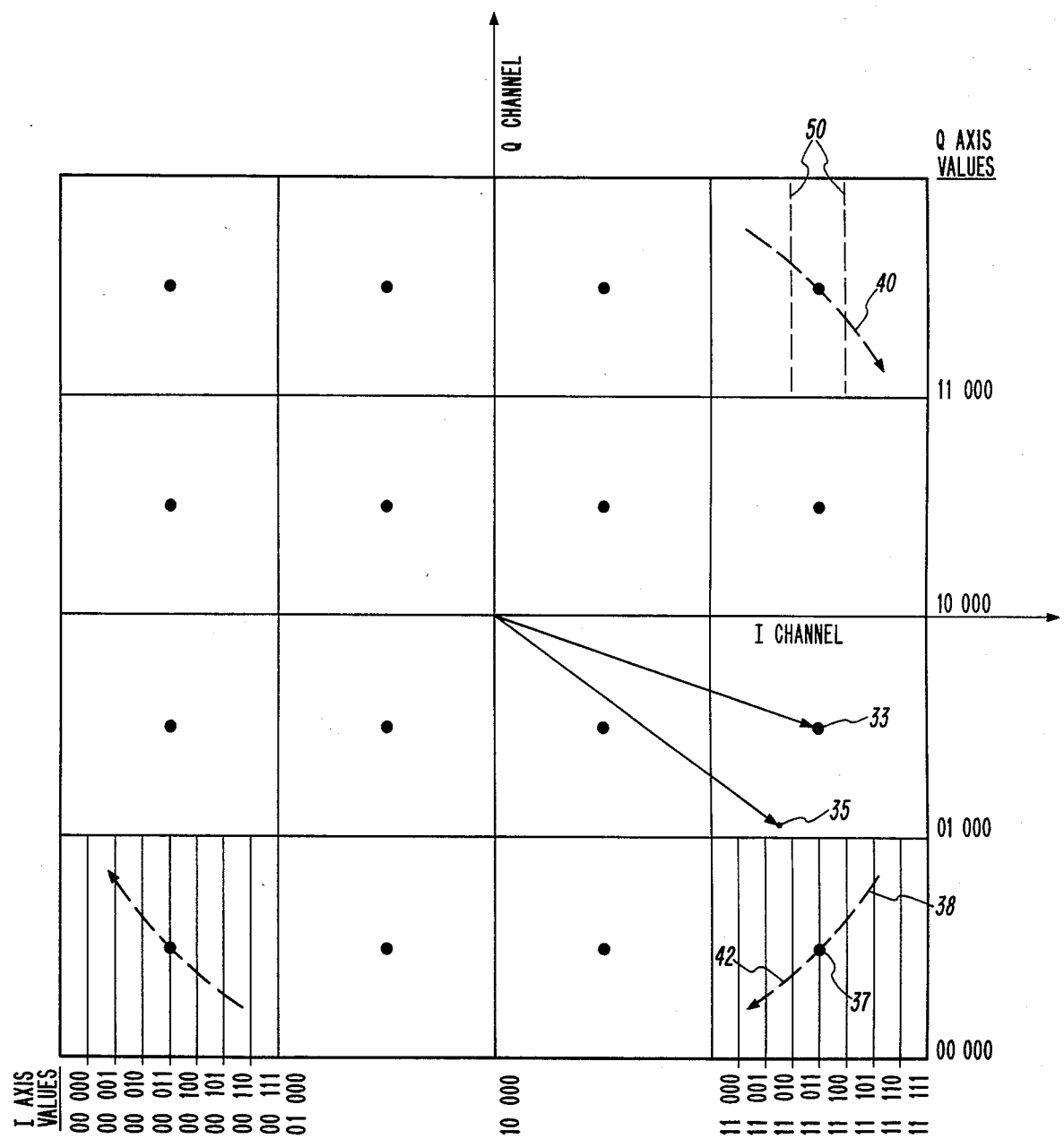
FIG. 2 is a diagram of a 16 QAM vector space as related to the system of FIG. 1.

FIG. 2 is a diagram of the signal vector space for a 16 QAM signal. Electrical signals are conventionally represented as a two dimensional vector having a magnitude given by the amplitude of the signal and a phase equal to the phase of the signal. If the phase is taken with respect to a reference waveform of the same or similar frequency, then the signal vector may remain at a substantially fixed phase angle indicating the difference in phase between the signal and the reference waveform or may move in relatively slow rotation about the origin.

If FIG. 2 is viewed as representing the vector space of the received QAM signal referenced to its suppressed carrier, then the QAM signal at any instant can, in the absence of distortion or noise, be represented by one of sixteen vectors extending from the origin to one of the dots such as dot 33. It is the task of the demodulator and a decoder, which follows the demodulator and is not described here, to identify which of these vector values is being received at any given instant.

As a practical matter, the demodulator identifies any vector value lying in the box surrounding dot 33 with the ideal state represented by dot 33. The way this works in the demodulator of FIG. 1, can be seen considering a sample signal vector value represented by point 35 in the lower right hand quadrant of FIG. 2. The five output bits of I channel A/D converter 20 are shown along the bottom of FIG. 2 as the I axis values or coordinates. Thus the I axis coordinate of signal point 35 is 11010. The Q channel A/D converter 21 output is the Q access coordinate namely 01000. For the I and Q channel data outputs, only the two most significant bits of the analog-to-digital converters are used, so that the I channel output is 11 and the Q channel output is 01. These values would be output by the demodulator for any signal vector in the box containing dots 35 and 33.

The three least significant bits of A/D converter 20 measure the distance of a point along the I axis from one side of a box to the other. As can be seen by the two boxes which are subdivided in FIG. 2, the three least significant bits progress in increments of one from 000 on the left to 111 on the right for each box. The three least significant bits of A/D converter 21 provide the same measure, but this is not shown in FIG. 2.

If the ideal QAM vector states are shown in the I-Q space referred to a waveform which is not exactly phase aligned with the suppressed QAM carrier, then the states will be moved from the positions shown in FIG. 2. For example, a phase difference between the reference waveform and the actual carrier will cause the ideal state corresponding to dot 37 to move one direction or another along dashed line 38. This effect is observed when the signal applied by voltage-controlled oscillator 29 to phase detector 12 or 13 is not exactly phase aligned with the QAM carrier. If there is a difference in frequency between the output of voltage-controlled oscillator 29 and the QAM carrier, then the sixteen QAM states will rotate about the origin of the I-Q space at an angular frequency determined by the amount of that frequency difference.

PHASE CONTROL OPERATION

In the description of this section, it will be assumed that basic frequency and phase lock have been acquired in the phase locked loop including voltage-controlled oscillator 29. Under these conditions and in the absence of other distortion and noise, the control process would control the trajectory of point 37 in small excursions back and forth along dashed arc 38. In the presence of transmission distortion and noise, vectors such as that represented by point 35 will be shifted along arcs about the I-Q origin by phase differences between the voltage-controlled oscillator output and the QAM carrier.

In using the three least significant bits of A/D converter 20 for phase control, provision must be made for the fact that the phase trajectories indicated by arrows 40 and 42 in FIG. 2 are the same, but one trajectory causes the value of the three least significant bits to increase, while the other causes that value to decrease. In FIG. 1, this is dealt with by multiplier 22 which multiplies the three least significant bits from the I channel A/D converter 20 by the most significant bit from the Q channel. The effect of this is to change the sign of the three least significant bits depending on whether the state being demodulated is in the upper or lower half of the I-Q space of FIG. 2. The overall result is that trajectories in the direction of arrow 40 and 42 each result in an increasing value for the three bits after the multiplication.

The group of three bits, with the sign thereof controlled by multiplier 22, is input to D/A converter 25 to provide an analog voltage corresponding to the group of bits. This variable analog voltage corresponding to the group of bits is applied to one input of an operational amplifier-based active filter 27. To the opposite input of filter 27 is applied a fixed reference voltage derived from D/A converter 25. The value of this reference voltage is the midpoint of the analog voltage output range of the D/A converter. As a result, filter 27 receives an error voltage which is a measure of the deviation, in the I dimension, of a vector from the middle of the corresponding box in the vector space of FIG. 2. For example, a vector located at dot 33 in that figure would produce a substantially zero error signal to filter 27, but a vector at point 35 would produce an error signal indicative of the separation of points 33 and 35 in the I dimension.

At this point, the nature of the phase control exercised in the system of FIG. 1 can be understood. If there is any difference in phase between the output of voltage-controlled oscillator 29 and the QAM carrier, it will result in an error signal applied to filter 27. Filter 27 smooths out variations in error signal over a number of demodulated data values. In a preferred embodiment, filter 27 was selected so as to give a phase locked loop bandwidth of 25 kHz and damping factor of approximately one. If there is a nonzero error signal after this smoothing, it is applied to voltage-controlled oscillator 29 with a polarity so as to reduce the difference in phase between the oscillator ouput and the QAM signal. Negative feedback in the phase locked loop will continuously drive the error signal toward zero, thereby deriving an output from voltage-controlled oscillator 29 which is phase locked to the QAM carrier.

It will be apparent to those skilled in the art that various numbers of n-m bits can be used to provide the error signal employed in the present invention. If only one bit is used to generate the error signal, then the error signal is relatively gross compared with the three bit embodiment described.

ACQUISITION OF PHASE LOCK

Figure 3:
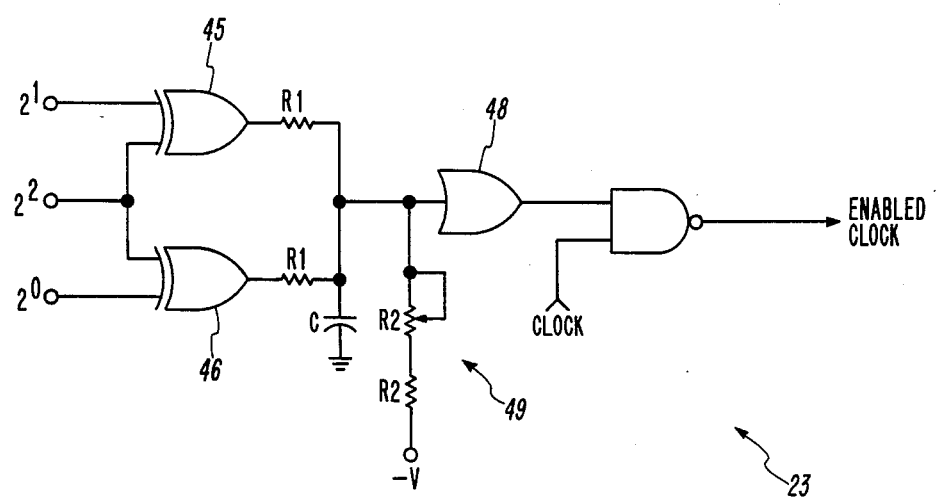
FIG. 3 is a schematic diagram of a clock enable circuit employed in the system of FIG. 1.

Acquisition of frequency and phase lock in the circuit of FIG. 1 is accomplished by controlling the clocking of D/A converter 25. Carrier clock enable circuit 23, shown in detail in FIG. 3, controls the enabling of a system clock to D/A converter 25. The three n-m bits are connected to enable circuit 23 at the inputs of exclusive OR gates 45 and 46. The most significant of these three bits is applied to both of gates 45 and 46 as shown. OR gate 48 with bias network 49 forms a threshold detector.

The effect of circuit 23 can be seen in FIG. 2, referring to dashed lines 50. Lines 50 illustrate a condition in which the bias network 49 has been set so that OR gate 48 produces a logic one, enabling the system clock, only when the three n-m bits have a value between the dashed lines 50. This would correspond to the bit combinations 011 and 100 as shown at the bottom of FIG. 2. By changing bias network 49, dashed lines 50 could be more widely separated to include, for example, bit combinations 010 and 101 as well. Of course, this same criterion for clock enablement applies to every block in FIG. 2.

During the approach to frequency and phase lock acquisition, the QAM signal vectors are rotating about the origin of the I-Q space, as described above. During this rotation, there will be times when the signal vectors fall in the threshold area delineated by lines 50. This will cause the enablement of a clock to D/A converter 25 and the application of an error signal to filter 27. Of course, during acquisition there will not be an enabled clock and accompanying error signal for each received QAM vector, as occurs after phase lock has been acquired. However, as the error signals do occur, the resulting smoothed error signal will tend to drive voltage-controlled oscillator 29 toward frequency and phase lock with the QAM carrier. Once frequency and phase lock have been acquired, the operation of the demodulator system according to the invention is as described previously herein.

What is claimed is:

1. A system for the demodulation of a Quadrature Amplitude Modulation (QAM) signal, of the type having in-phase and quadrature channels, each having an m bit demodulated output, thereby defining a $2^m \times 2^m$ QAM vector space, said system comprising:

detector means in each of said channels, each detector means responsive to said QAM signal and a signal at a carrier frequency input, and each for generating an analog output;

an analog-to-digital converter, responsive to said analog signal in a first one of said channels, for providing said m bits and a bit group including at least the most significant one of the bits less significant than said m bits in the digital representation of the analog signal;

a phase-locked loop including said detector means in said first channel and said analog-to-digital converter, and further including a voltage controlled oscillator responsive to an analog voltage, hybrid means for applying the output of said voltage controlled oscillator to the carrier frequency inputs of said detector means, after in-phase and quadrature phase shifting, and means, including a digital-to-analog converter, for deriving from said bit group a measure of the difference in phase between said demodulated output vector space and the oscillator output applied to said first channel, and for providing an analog voltage representative of said measure to said voltage controlled oscillator, whereby said voltage controlled oscillator in said loop is controlled to provide a signal to said carrier frequency inputs which is phase locked with respect to said QAM vector space, for properly demodulating said QAM signal.

2. The system of claim 1, wherein said means for deriving a measure includes means, responsive to said bit group, for providing said bit group, with the sign thereof controlled, to the digital-to-analog converter.

3. The system of claim 2, wherein said means for controlling the sign includes means for controlling said sign in response to the most significant bit of said m bits in the second one of said channels.

4. The system of claim 3, wherein said means for controlling the sign includes means for multiplying said bit group by said most significant bit of said m bits.

5. The system of claim 1, wherein said bit group includes at least the most significant three of said bits less significant than said m bits.

6. The system of claim 2, wherein said means for providing an analog voltage includes means for deriving said analog voltage from the deviation of the digital-to-analog converter output about its mid point value.

7. The system of claim 2, wherein said means for providing an analog voltage includes means for filtering the output of said digital-to-analog converter.

8. The system of claim 1, further including means for enabling a clock signal to said digital-to-analog converter whenever the demodulated output corresponds to one of plural preselected regions in said QAM vector space.

9. The system of claim 8, wherein said means for enabling said clock signal includes means responsive to said bit group for enabling said clock signal when said bit group assumes one of a preselected set of values.

10. A system for the demodulation of a Quadrature Amplitude Modulation (QAM) signal, of the type having in-phase and quadrature channels, each having an m bit demodulated output, thereby defining a $2^m \times 2^m$ QAM vector space, said system comprising:

detector means in each of said channels, each detector means responsive to said QAM signal and a signal at a carrier frequency input, and each for generating an analog output;

an analog-to-digital converter, responsive to said analog signal in a first one of said channels, for providing said m bits and a bit group including a plurality of the most significant bits less significant than said m bits in the digital representation of the analog signal;

a phase locked loop including said detector means in said first channel and said analog-to-digital converter, and further including a voltage-controlled oscillator responsive to an analog voltage, hybrid means for applying the output of said voltage-controlled oscillator to the carrier frequency inputs of said detector means, after in-phase and quadrature phase shifting, and means for deriving from said bit group a measure of the difference in phase between said demodulated output vector space and the oscillator output applied to said first channel, and for providing an analog voltage representative of said measure to said voltage-controlled oscillator, including
    means for providing an output which is said bit group with the sign thereof controlled in response to the most significant bit of said m bits in the second one of said channels,
    a digital-to-analog converter responsive to the sign controlled bit group output,
    means for filtering the output of said digital-to-analog converter to provide an analog voltage, and
    means for referencing the analog voltage provided for said oscillator to a midpoint value of said bit group; and
means for enabling a clock signal to said digital-to-analog converter when the bit group assumes one of a preselected set of values,
whereby said voltage-controlled oscillator in said loop is controlled to provide a signal to said carrier frequency inputs which is phase locked with respect to said QAM vector space, for properly demodulating said QAM signal.

11. A system for the demodulation of a Quadrature Amplitude Modulation (QAM) signal, of the type having in-phase and quadrature channels, each having an m bit demodulated output, thereby defining a $2^m \times 2^m$ QAM vector space, said system comprising:
    detector means in each of said channels, each detector means responsive to said QAM signal and a signal at a carrier frequency input, and each for generating an analog output;
    an analog-to-digital converter, responsive to said analog signal in a first one of said channels, for providing said m bits and a bit group including at least the most significant one of the bits less significant than said m bits in the digital representation of the analog signal;
    a phase-locked loop including said detector means in said first channel and said analog-to-digital converter, and further including
    oscillator means for generating an output signal the frequency of which depends on the value of a control signal,
    means for applying the output of said oscillator means to the carrier frequency inputs of said detector means, after in-phase and quadrature phase shifting, and
    means for deriving from said bit group a measure of the difference in phase between said demodulated output vector space and the oscillator output applied to said first channel, and for providing a control signal representative of said measure to said oscillator means,
    whereby said oscillator means in said loop is controlled to provide a signal to said carrier frequency inputs which is phase locked with respect to said QAM vector space, for properly demodulating said QAM signal.

12. The system of claim 11, wherein said means for deriving a measure includes means, responsive to said bit group, for providing said bit group with the sign thereof controlled in response to the most significant bit of said m bits in the second one of said channels.

13. The system of claim 11, wherein said means for providing a control signal includes means for referencing said control signal with respect to a midpoint value of said bit group.

14. The system of claim 11, wherein said means for providing a control signal includes means for smoothing variations in the value of said bit group.

15. The system of claim 11, wherein said means for deriving a measure and providing a control signal includes
    means, responsive to the value of said bit group, for providing the bit group value with the sign thereof controlled by the most significant bit of said m bits in the second one of said channels,
    means for referencing said control signal with respect to a substantially midpoint value of said bit group, and
    means for smoothing variations in the value of said bit group.

* * * * *